US008781506B2

(12) United States Patent
Siomina et al.

(10) Patent No.: US 8,781,506 B2
(45) Date of Patent: Jul. 15, 2014

(54) NETWORK-SIDE POSITIONING OCCASION ADJUSTMENT VIA ASSISTANCE DATA ADJUSTMENT

(75) Inventors: Iana Siomina, Solna (SE); Yang Zhang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 198 days.

(21) Appl. No.: 13/390,551

(22) PCT Filed: Jan. 19, 2012

(86) PCT No.: PCT/SE2012/050042
§ 371 (c)(1),
(2), (4) Date: Feb. 15, 2012

(87) PCT Pub. No.: WO2012/108813
PCT Pub. Date: Aug. 16, 2012

(65) Prior Publication Data
US 2012/0270572 A1    Oct. 25, 2012

(30) Foreign Application Priority Data
Feb. 11, 2011   (WO) ................ PCT/CN2011/000211

(51) Int. Cl.
*H04W 4/02* (2009.01)
*G01S 5/02* (2010.01)
*G01S 5/10* (2006.01)
*H04W 24/10* (2009.01)
*H04W 64/00* (2009.01)

(52) U.S. Cl.
CPC ............. *G01S 5/0236* (2013.01); *H04W 24/10* (2013.01); *G01S 5/10* (2013.01); *H04W 64/00* (2013.01)
USPC ..................................... 455/456.6; 455/456.1

(58) Field of Classification Search
USPC ................................ 455/456.1, 456.6, 401.2
See application file for complete search history.

(56) References Cited

U.S. PATENT DOCUMENTS

| 6,646,596 | B2 * | 11/2003 | Syrjarinne et al. ........ 342/357.25 |
| 7,376,430 | B2 * | 5/2008 | Matsuda ..................... 455/456.2 |
| 2006/0293066 | A1 * | 12/2006 | Edge et al. ................. 455/456.3 |
| 2010/0331009 | A1 | 12/2010 | Krishnamurthy et al. |
| 2011/0039577 | A1 * | 2/2011 | Stern-Berkowitz et al. ........................ 455/456.1 |
| 2011/0081917 | A1 * | 4/2011 | Frank et al. ................ 455/456.1 |
| 2011/0201279 | A1 * | 8/2011 | Suzuki et al. ............. 455/67.11 |

FOREIGN PATENT DOCUMENTS

| WO | 2005106523 A1 | 11/2005 |
| WO | 2011056119 A1 | 5/2011 |
| WO | 2011142710 A1 | 11/2011 |
| WO | 2012021097 A2 | 2/2012 |
| WO | 2012023893 A1 | 2/2012 |
| WO | 2012044246 A1 | 4/2012 |

* cited by examiner

Primary Examiner — Cong Tran
(74) Attorney, Agent, or Firm — Coats & Bennett, PLLC

(57) ABSTRACT

A network node (44) herein advantageously eliminates or at least mitigates timing ambiguities associated with when a user equipment (36) is to perform assisted positioning measurements. To do so, the network node (44) generates assistance data to indicate that a first cell for the measurements (e.g., a reference cell) has a greater positioning occasion periodicity than it actually has. This greater periodicity may be, for example, a multiple of the first cell's actual positioning occasion periodicity. Regardless, the node (44) also generates the assistance data to indicate positioning occasion timing for at least a second cell relative to positioning occasion timing for the first cell that is based on this greater periodicity. Finally, the node (44) sends this generated assistance data to the user equipment to assist with the positioning measurements.

26 Claims, 9 Drawing Sheets

```
ProvideAssistanceData-r9-IEs ::= SEQUENCE {
    commonIEsProvideAssistanceData   CommonIEsProvideAssistanceData   OPTIONAL,   -- Need ON
    a-gnss-ProvideAssistanceData     A-GNSS-ProvideAssistanceData     OPTIONAL,   -- Need ON
    otdoa-ProvideAssistanceData      OTDOA-ProvideAssistanceData      OPTIONAL,   -- Need ON
    epdu-Provide-Assistance-Data     EPDU-Sequence                    OPTIONAL,   -- Need ON
    ...
}
```

*FIG. 3*
*(PRIOR ART)*

```
-- ASN1START

OTDOA-ProvideAssistanceData ::= SEQUENCE {
    otdoa-ReferenceCellInfo        OTDOA-ReferenceCellInfo        OPTIONAL,
    otdoa-NeighbourCellInfo        OTDOA-NeighbourCellInfoList    OPTIONAL,
    otdoa-Error                    OTDOA-Error                    OPTIONAL,
    ...
}

-- ASN1STOP
```

*FIG. 4*
*(PRIOR ART)*

NETWORK-SIDE POSITIONING OCCASION ADJUSTMENT VIA ASSISTANCE DATA ADJUSTMENT

RELATED APPLICATION

This application claims priority from International Patent App. No. PCT/CN2011/000211, which was filed on 11 Feb. 2011 and was entitled "Non-Ambiguous Positioning Measurements with Cell-Specific Signal Periodicity."

TECHNICAL FIELD

The present invention generally relates to transmitting data a user equipment for assisting the user equipment in performing measurements on periodic positioning signals, and particularly relates to adjusting that data in order to mitigate potential ambiguity arising within the data.

BACKGROUND

The availability of several techniques and devices for identifying the geographical location of mobile device users has enabled a large variety of commercial and non-commercial services, such as navigation assistance, enhanced social networking, location-aware advertising, and location-aware emergency calls. However, different services may have different positioning accuracy requirements imposed by the application. In addition, some regulatory requirements on the positioning accuracy for basic emergency services exist in some countries, such as the FCC's E-911-related requirements in the United States.

In many environments, the position of a mobile device user can be accurately estimated by using positioning methods based on GPS (Global Positioning System) or other satellite-based system. Nowadays, wireless networks are often able to provide positioning-related assistance to mobile terminals (often referred to as user equipment, or UEs, or wireless terminals, mobile stations, or simply "mobiles") to improve the terminal's receiver sensitivity and GPS start-up performance. Several of these techniques are known as Assisted-GPS positioning, or A-GPS.

GPS or A-GPS receivers may not be available in all UE, however. Furthermore, GPS is known to fail in certain indoor environments and in urban "canyons" in the radio shadows caused by tall buildings. Complementary terrestrial positioning methods, such as one approach called Observed Time-Difference-of-Arrival (OTDOA), have therefore been standardized by the 3rd-Generation Partnership Project (3GPP) and are deployed in various wireless networks. In addition to OTDOA, the 3GPP standards for the so-called Long-Term Evolution (LTE) wireless system also specify methods, procedures and signaling support for techniques called Enhanced Cell ID (E-CID) and Assisted Global Navigation Satellite System (A-GNSS). Later, a network-based technique called Uplink Time-Difference-of-Arrival (UTDOA) may also be standardized for LTE.

Three key network elements for providing location services (LCS) in an LTE positioning architecture include the LCS Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in the LCS targets themselves. An LCS Client sends a request to LCS Server to obtain location information, and LCS Server processes and serves the received requests and sends the positioning result and optionally a velocity estimate to the LCS Client.

Position calculation can be conducted, for example, by a UE or by a positioning server, such as an Enhanced Serving Mobile Location Center, E-SMLC, or Secure User Plan Location (SUPL) Location Platform (SLP) in LTE. The former approach corresponds to the UE-based positioning mode, whilst the latter corresponds to the UE-assisted positioning mode.

Two positioning protocols operating via the radio network exist in LTE, LTE Positioning Protocol (LPP) and LPP Annex (LPPa). The LPP is a point-to-point protocol between a LCS Server and a LCS target device, used in order to position the target device. LPP can be used both in the user and control plane, and multiple LPP procedures are allowed in series and/or in parallel thereby reducing latency. LPPa is a protocol between evolved Node B (eNodeB) and LCS Server specified only for control-plane positioning procedures, although it still can assist user-plane positioning by querying eNodeBs for information and eNodeB measurements. SUPL protocol is used as a transport for LPP in the user plane. LPP has also a possibility to convey LPP extension messages inside LPP messages, e.g. currently Open Mobiel Alliance (OMA) LPP extensions are being specified (LPPe) to allow e.g. for operator-specific assistance data or assistance data that cannot be provided with LPP or to support other position reporting formats or new positioning methods.

A high-level architecture of such an LTE system 10 is illustrated in FIG. 1. In FIG. 1, the system 10 includes a UE 12, a radio access network (RAN) 14, and a core network 16. The UE 12 comprises the LCS target. The core network 16 includes an E-SMLC 18 and/or an SLP 20, either of which may comprise the LCS Server. The control plane positioning protocols with the E-SMLC 14 as the terminating point include LPP, LPPa, and LCS-AP. The user plane positioning protocols with the SLP 16 as the terminating point include SUPL/LPP and SUPL. Although note shown, the SLP 20 may comprise two components, a SUPL Positioning Center (SPC) and a SUPL Location Center (SLC), which may also reside in different nodes. In an example implementation, the SPC has a proprietary interface with E-SMLC, and an Llp interface with the SLC. The SLC part of the SLP communicates with a P-GW (PDN-Gateway) 22 and an External LCS Client 24.

Additional positioning architecture elements may also be deployed to further enhance performance of specific positioning methods. For example, deploying radio beacons 26 is a cost-efficient solution which may significantly improve positioning performance indoors and also outdoors by allowing more accurate positioning, for example, with proximity location techniques.

To meet varying demands for different Location-Based Services (LBS), an LTE network will deploy a range of complementing methods characterized by different performance in different environments. Depending on where the measurements are conducted and where the final position is calculated, the methods can be UE-based, UE-assisted, or network-based, each with own advantages. The following methods are available in the LTE standard for both the control plane and the user plane: (1) Cell ID (CID), (2) UE-assisted and network-based E-CID, including network-based angle of arrival (AoA), (3) UE-based and UE-assisted A-GNSS (including A-GPS), and (4) UE-assisted OTDOA.

Several other techniques such as hybrid positioning, fingerprinting positioning and adaptive E-CID (AECID) do not require additional standardization and are therefore also possible with LTE. Furthermore, there may also be UE-based versions of the methods above, e.g. UE-based GNSS (e.g. GPS) or UE-based OTDOA, etc. There may also be some alternative positioning methods such as proximity based location. UTDOA may also be standardized in a later LTE release, since it is currently under discussion in 3GPP. Similar methods, which may have different names, also exist for radio-access technologies (RATs) other than LTE, such as CDMA, WCDMA or GSM.

With particular regard to the OTDOA positioning method, this method makes use of the measured timing of downlink signals received from multiple base stations (evolved NodeBs, or eNodeBs, in LTE) at the UE. The UE measures the timing of the received signals using assistance data received from the LCS server, and the resulting measurements are used to locate the UE in relation to the neighbouring eNodeBs.

More specifically, the UE measures the timing differences for downlink reference signals received from multiple distinct locations or neighboring cells. For each (measured) neighbor cell, the UE measures Reference Signal Time Difference (RSTD), which is a relative timing difference between the neighbor cell and a defined reference cell. The UE position estimate is then found as the intersection of hyperbolas corresponding to the measured RSTDs. At least three measurements from geographically dispersed base stations with a good geometry are needed to solve for two coordinates of the UE and the receiver clock bias. In order to solve for position, precise knowledge of the transmitter locations and transmit timing offset is needed.

To enable positioning in LTE and facilitate positioning measurements of a proper quality and for a sufficient number of distinct locations, new physical signals dedicated for positioning (positioning reference signals, or PRS) have been introduced and low-interference positioning subframes have been specified in 3GPP. Details are specified in 3GPP TS 36.211; as of February 2011, version 10.0.0 of this specification is available from http://www.3gpp.org.

PRS are transmitted from one antenna port of a base station according to a pre-defined pattern. A frequency shift, which is a function of Physical Cell Identity (PCI), can be applied to the specified PRS patterns to generate orthogonal patterns. The mapping of frequency shifts to PCT models an effective frequency reuse of six, which makes it possible to significantly reduce neighbor cell interference on the measured PRS and thus improve positioning measurements. Even though PRS have been specifically designed for positioning measurements and in general are characterized by better signal quality than other reference signals, the standard does not mandate using PRS. Other reference signals, e.g. cell-specific reference signals (CRS) could be used for positioning measurements, in principle.]

PRS are transmitted in pre-defined positioning sub-frames grouped by several consecutive sub-frames ($N_{PRS}$), i.e., one positioning occasion. FIG. 2, for instance, shows an example where one positioning occasion includes PRS transmitted in $N_{PRS}$=6 consecutive sub-frames. Positioning occasions occur periodically with a defined periodicity $T_{PRS}$ of N sub-frames, i.e., the time interval between two positioning occasions. The standardized periods $T_{PRS}$ are 160, 320, 640, and 1280 ms, and the standardized number of consecutive sub-frames $N_{PRS}$ may be 1, 2, 4, or 6

Information about such PRS and other information that will assist with positioning measurements is included in so-called assistance data. Different sets of assistance data are typically used for different methods. Regardless, the positioning assistance data is sent by the positioning server, or via some other node, to UEs or other radio nodes in order to assist with positioning measurements. For example, assistance data may be sent via LPP to an eNodeB for transmission to the UE. In this case, the transmission of assistance data may be transparent to the eNodeB and the Mobility Management Entity (MME). The assistance data may also be sent by the eNodeB via LPPa to a positioning server for further transfer to the UE. In some cases, the assistance data may be sent on request from a wireless device that needs to perform measurements. In other cases, the assistance data is sent in an unsolicited way.

In LTE, the assistance data may be requested and provided over LPP protocol by including requestAssistanceData and provideAssistanceData elements in the LPP message, respectively. The current LTE standard specifies the following structure for provideAssistanceData, which is illustrated in FIG. 3, where the commonIEsProvideAssistanceData information element (IE) is provided for future extensibility only and is not used so far. The LTE assistance data may thus be provided for A-GNSS and OTDOA. The EPDU-Sequence contains IEs that are defined externally to LPP by other organizations, which currently may only be used for OMA LPP extensions (LPPe).

Since for OTDOA positioning PRS signals from multiple distinct locations need to be measured, the UE receiver may have to deal with PRS that are much weaker than those received from the serving cell. Furthermore, without an approximate knowledge of when the measured signals are expected to arrive in time and what is the exact PRS pattern, the UE must perform signal search within a large window. This can impact the time and accuracy of the measurements as well as the UE complexity. To facilitate UE measurements, the network transmits assistance data to the UE, which includes, among other things, reference cell information, a neighbour cell list containing Physical Cell Identifiers (PCIs) of neighbour cells, the number of consecutive downlink subframes within a positioning occasion, PRS transmission bandwidth, frequency, etc.

In LPP, the OTDOA assistance data is provided within the Information Element (IE) OTDOA-ProvideAssistanceData, as shown in FIG. 4. Similar structures for OTDOA exist in LPPe.

The OTDOA assistance data includes information about the reference cell and neighbour cells for which OTDOA is to be determined. The neighbour cells may or may not be on the same frequency as the reference cell, and the reference cell may or may not be on the same frequency as the serving cell, and may or may not be the serving cell. Measurements that involve cells on a frequency different than the serving cell are inter-frequency measurements. Measurements on the same frequency as the serving cell are intra-frequency measurements. Different requirements apply for intra- and inter-frequency measurements.

For each cell in the assistance data, PRS information may be provided. The following information comprises the PRS information, according to 3GPP TS 36.355: PRS, bandwidth, PRS configuration index, the number $N_{PRS}$ of consecutive DL subframes (1, 2, 4, or 6) where PRS are transmitted, and muting information. PRS configuration index for a cell, as specified in 3GPP TS 36.211, defines the offset of that cell's first PRS subframe from a reference time point (SFN=0, where SFN refers to System Frame Number), as well as the periodicity $T_{PRS}$ of that cell's positioning occasions.

PRS information, in particular PRS periodicity, may be cell-specific. The cell-specific nature of the PRS information may be attributable to different cells belonging to different systems, different cells having different PRS bandwidths (e.g., a smaller bandwidth may require more frequent PRS occasions), different cells having different traffic loads (e.g., to reduce PRS overhead and capacity loss when no data transmissions are allowed in PRS positioning occasions, less frequent PRS positioning occasions may be configured), or the like.

Furthermore, positioning occasions may be misaligned on purpose, e.g., due to network deployment issues. Such purposeful misalignment might exist, for instance, in a network with a mix of macro cells and low-power nodes (e.g., pico or femto nodes), since interference issues may be caused by that network deployment. In a synchronous, or at least subframe-aligned network, an alternative could be to configure more frequent PRS positioning occasions that are aligned for cells, but to configure muting to avoid PRS collisions with interfering neighbour cells. See, e.g., International Patent Application PCT/SE2010/050947.

Positioning occasion misalignment may also be attributable to inter-frequency RSTD measurements. More particularly, some UEs require measurement gaps in order to perform inter-frequency RTSD measurements. The measurement gaps are configured by an eNodeB upon an indication from a UE. Measurement gaps need to be aligned with PRS positioning occasions of the measured cell. However, according to the standard, the measurement gaps cannot collide with PRS positioning occasions of the cells belonging to the serving carrier. Given that the PRS periodicity is a multiple of the measurement gap periodicity (40 ms, when inter-frequency RSTD measurements are configured), this means that PRS positioning occasions of a neighbour cell cannot collide with PRS positioning occasion of the reference cell. So, in networks supporting inter-frequency RSTD measurements, PRS positioning occasions shall be misaligned between cells on the serving carrier and another carrier. This implicitly means that PRS positioning occasions shall be misaligned among all carriers that may appear in the same assistance data message for a UE, since different UEs may be served by different cells. Nonetheless, PRS positioning occasions will typically be fully or partially aligned in cells operating on the same frequency. With this requirement, there is no reason to require PRS positioning occasion to be the same on all frequencies.

In view of these different timing possibilities for PRS, assistance data provided to a UE assists the UE to determine at least the relationship between the timing of different PRS (e.g., relative to the timing of PRS for the reference cell). For example, the following parameters specified in 3GPP TS 36.355 may be used for determining the timing relation between PRS signals received in the first subframes of the positioning occasions of two cells: (a) slotNumberOffset; (b) prs-SubframeOffset; (c) expectedRSTD; (d) expectedRSTD-Uncertainty; (e) prs-ConfigurationIndex. Then, based on muting information (prs-MutingInfo), the UE also can determine in which positioning occasions the UE is supposed to measure.

Nonetheless, known approaches for employing assistance data remain insufficient for supporting cell-specific PRS configurations. Indeed, practical scenarios may arise where known approaches cause a UE to incorrectly determine the timing relation between a positioning occasion of one cell and a positioning occasion in another cell. Indeed, in such a scenario, one timing relation appears correct to the node generating the assistance data, and a different timing relation appears correct to the UE receiving the assistance data. This ambiguity in which timing relation is correct leads to the UE's incorrect determination.

The current RSTD reporting delay requirements are defined as a function of $T_{PRS}$ (see e.g. [3GPP TS 36.133, Section 8.1.2.5, E-UTRAN Intra-Frequency OTDOA Measurements] or [3GPP TS 36.133, Section 8.1.2.6, E-UTRAN Inter-Frequency OTDOA Measurements] and the corresponding test specification sections). However, it is not clear periodicity of which cell is meant, e.g., the reference or any of the neighbor cells in the same assistance data. It has been proposed to specify requirements with respect to the largest PRS periodicity for cells in the assistance data, which is, however, the worst-case assumption. Which assumption shall apply is still unclear in the standard, if different periodicities are to be supported.

Although the above problems have primarily been discussed in the context of certain wireless systems and certain positioning methods, these problems extend to other systems and other methods as well. Indeed, with Open Mobile Alliance (OMA) LPP extension (LPPe), the assistance data is enhanced with the possibility to assist a larger range of positioning methods. For example, the assistance data may also be provided for E-CID or other methods of other radio access technologies (RATs), e.g. OTDOA UTRA or E-OTD GSM, or other PLMN networks.

SUMMARY

Embodiments herein advantageously eliminate or at least mitigate timing ambiguities associated with when a UE is to perform assisted positioning measurements. Broadly described, a network node herein generates assistance data to indicate that a first cell for the measurements (e.g., a reference cell) has a greater positioning occasion periodicity than it actually has. This greater periodicity may be, for example, a multiple of the first cell's actual positioning occasion periodicity. Regardless, the node also generates the assistance data to indicate positioning occasion timing for at least a second cell relative to positioning occasion timing for the first cell that is based on this greater periodicity. Finally, the node sends this generated assistance data to the UE to assist with the positioning measurements.

By indicating that the first cell has a greater positioning occasion periodicity than it actually has, the node may degrade the measurement quality of the first cell, and even other cells, since the positioning measurements of those cells may occur less frequently. Despite this, indicating that the first cell has a greater positioning occasion periodicity than it actually has advantageously reduces the number of possible first cell positioning occasions on which the positioning occasion timing in the assistance data could be based. This in turn mitigates any potential timing ambiguity seen by the UE, and also may prevent the UE from performing measurements in unfavorable measurement occasions. Such unfavorable conditions might otherwise degrade the overall measurement quality. Some examples of unfavorable measurement occasions may be ambiguous UE behavior or unfavorable interference conditions (e.g., high interference).

In fact, at least some embodiments effectively eliminate this ambiguity by indicating that the first cell has at least as great of positioning occasion periodicity as the cell in the assistance data with the maximum periodicity. The network node may therefore determine the maximum positioning occasion periodicity amongst the cells included in the assistance data, and then generate the assistance data to indicate that the first cell has this maximum periodicity.

Given the inherent tradeoff between mitigating timing ambiguities in the assistance data and degrading measurement quality, one or more embodiments herein advantageously generate the assistance data to indicate that the first cell has a greater positioning occasion periodicity than it actually has only if doing so is needed to mitigate timing ambiguities and/or if other approaches to mitigating timing ambiguities prove unattainable or otherwise unacceptable. Regardless, assistance data generated herein is UE-specific, meaning that even if the first cell is indicated as having a greater periodicity for one UE, the first cell may be indicated as having its actual periodicity for other UEs.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 illustrates a data structure for the provideAssistanceData element specified by prior art LTE standards.

FIG. 4 illustrates a data structure for the OTDOA-ProvideAssistanceData element specified by prior art LTE standards.

DETAILED DESCRIPTION

Figure 1:
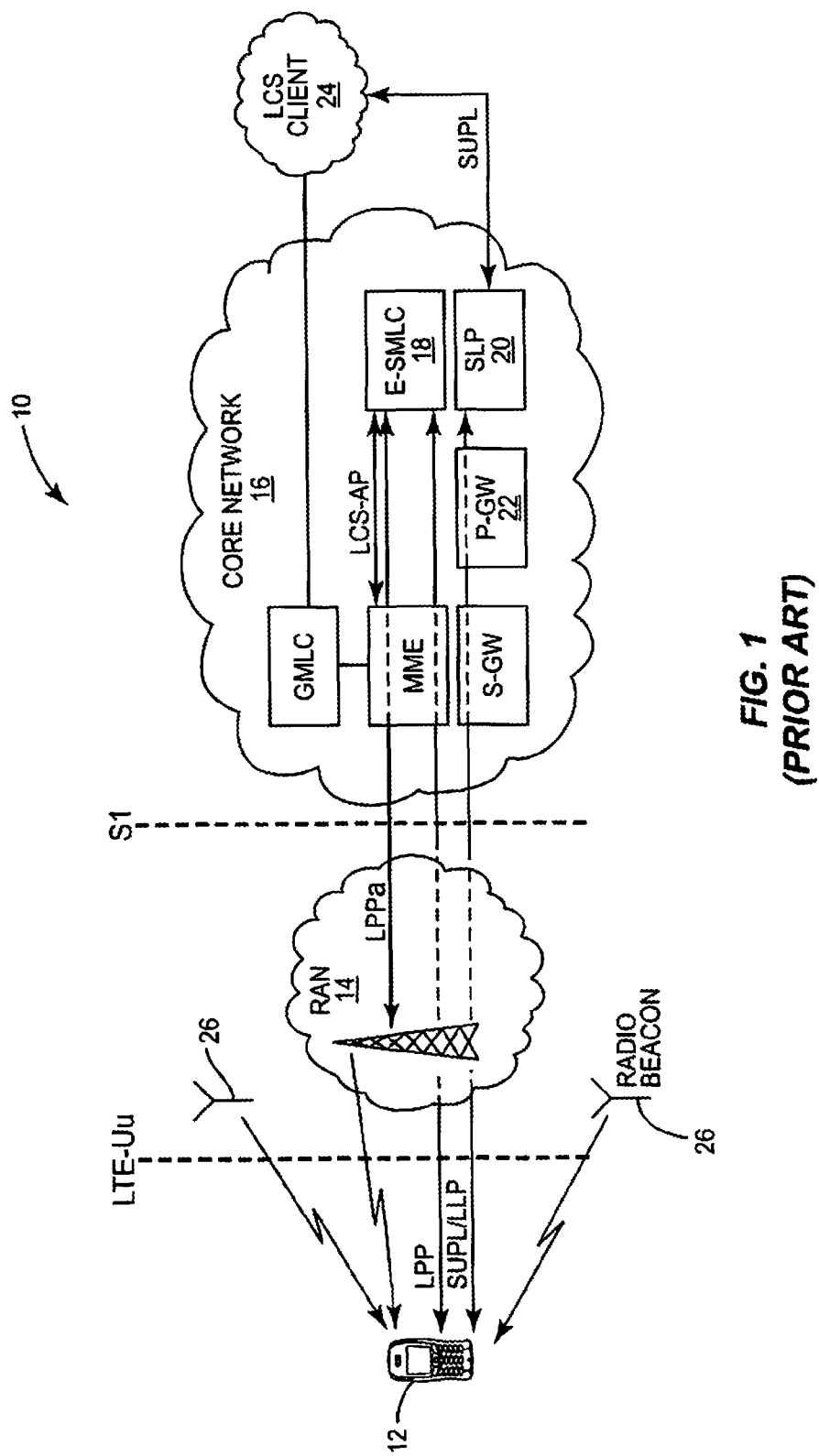
FIG. 1 is a block diagram of an LTE system configured to determine the geographic position of a user equipment.
Figure 2:
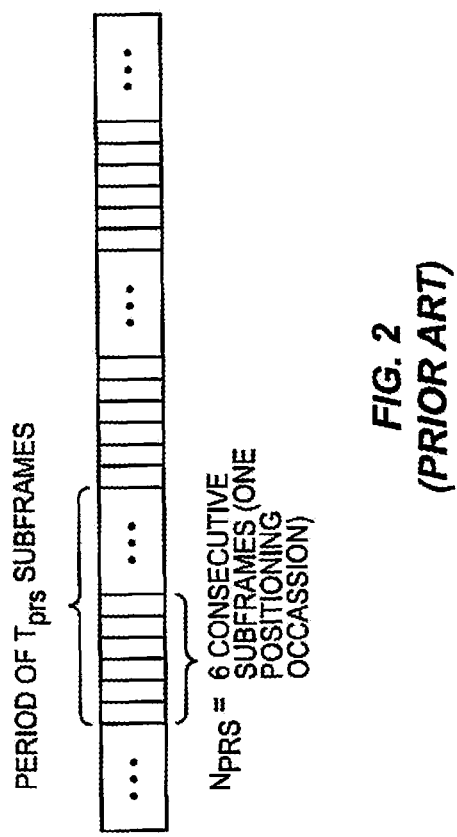
FIG. 2 illustrates the structure and timing of positioning reference signals in an LTE system.

FIG. 2 depicts a simplified example of wireless communication network 30 according to one or more embodiments. As shown, the network 30 includes a Radio Access Network (RAN) 32, a Core Network (CN) 34, and one or more user equipment (UE) 36. The RAN 32 and CN 34 enable a UE 36 to access one or more external networks 38, such as the Public Switched Telephone Network (PSTN) or the Internet.

The RAN 32 includes a number of base stations 40 that are geographically distributed across the wide geographic area served by the system 30. Each base station 40 provides radio coverage for one or more respective portions of that geographic area, referred to as cells 42. As shown, for example, base station 40-1 serves UEs 36 within cell 42-1, base station 40-2 serves UEs 36 within cell 42-2, and so on. Because of this, a UE 36 may move within or between cells 42 and may communicate with one or more base stations 40 at any given position.

Figure 5:
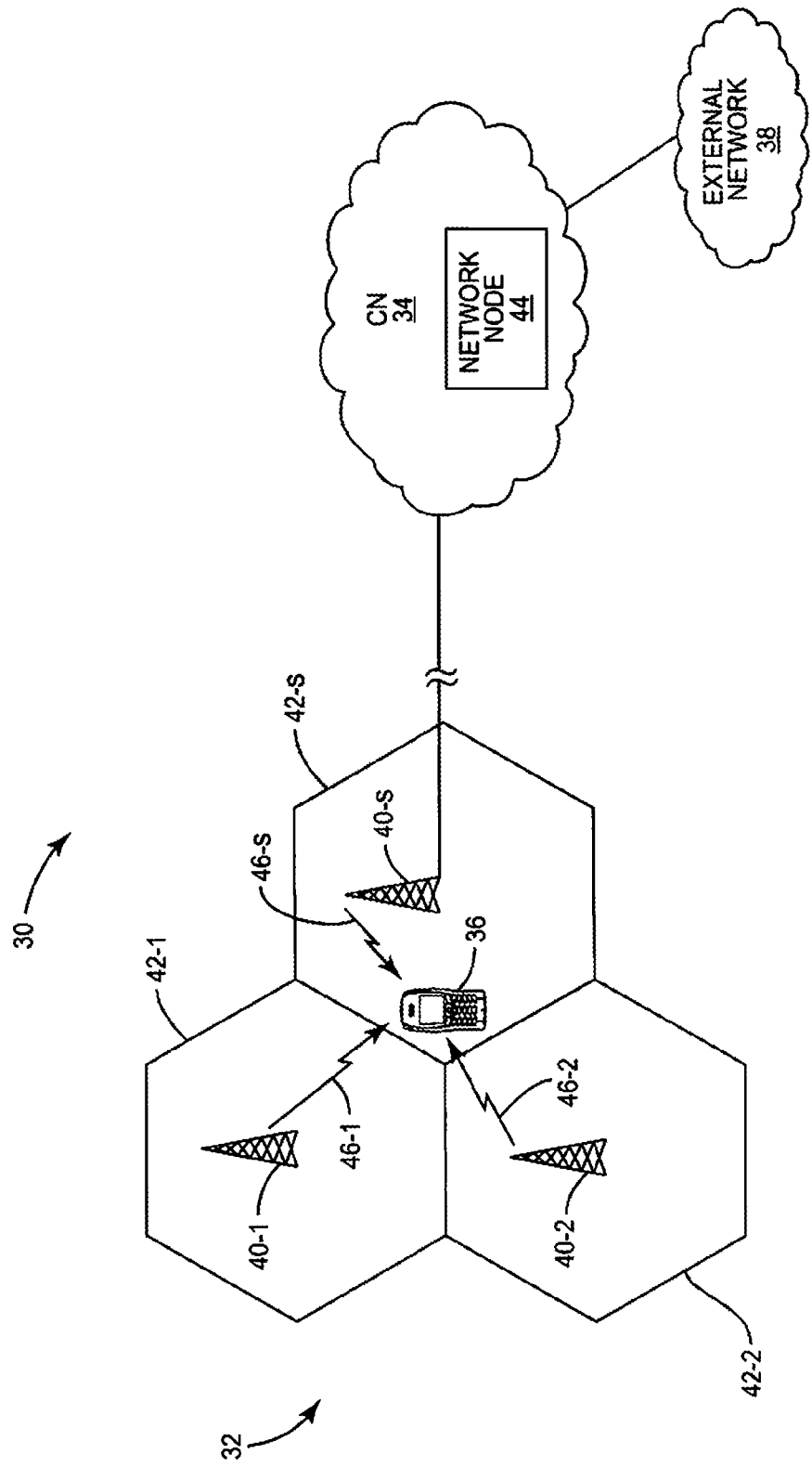
FIG. 5 is a block diagram of a wireless communication network that includes a network node configured according to one or more embodiments.

In this regard, FIG. 5 depicts a particular UE 36 that, at its current position, is served by base station 40-s. Thus, from the perspective of this UE 36, base station 40-s is the serving base station and cell 42-s is the serving cell. The other cells 42-1 and 42-2 physically neighbor the serving cell 42-s in the sense that they are geographically adjacent to the serving cell 42-s. These cells 42-1 and 42-2 are thus appropriately referred to as neighboring cells.

Each of the cells 42 (via its base station 40) periodically transmits positioning signals 46 during respective positioning occasions of those cells 42. A positioning signal 46 as used herein is specifically designed (e.g., with good signal quality) to be a signal on which a UE performs positioning measurements. And a positioning occasion of a cell 42 as used herein refers a periodic interval of time during which that cell transmits a positioning signal for measurement by a UE 36. Such measurements are to be used by the UE 36 itself, or some other network node 44 in the core network 35 (e.g., a positioning node), for determining the UE's geographic position.

In some embodiments, for example, such positioning measurements comprise timing measurements. In such a case, a UE may measure timing differences (e.g., RSTD, Rx-Tx, or TA) between different positioning signals 46 received from different cells 42. These timing differences are then used to estimate the UE's position with respect to the different cells 42.

Regardless of the particular type of positioning measurements, though, one of the cells 42 serves as a so-called reference cell for the UE's measurements. Positioning measurements performed with respect to this reference cell, as the name implies, serves as a reference for measurements performed with respect to other cells 42. For instance, where the positioning measurements are timing measurements, the UE 36 measures the difference between the time at which the UE 36 receives a positioning signal from the reference cell and the time at which the UE 36 receives a positioning signal from another cell 42. Any cell 42 may serve as the reference cell, including any one of the neighbor cells 42-1 and 42-2 or the serving cell 42-s.

To help the UE 36 perform these positioning measurements, the network node 44 transmits so-called assistance data to the UE 36. This assistance data indicates the positioning occasion timing for the cells 42 on which the UE 36 is to perform the positioning measurements. With knowledge of this positioning occasion timing, the UE 36 can time its measurement of each cell 42 to coincide with the times at which the cell 42 actually transmits its positioning signals 46.

Further contributing to the role played by the reference cell, the assistance data may indicate the positioning occasion timing for any given cell 42 relative to the positioning occasion timing for the reference cell. For example, the assistance data may indicate when a positioning occasion of a particular cell is to occur as a timing offset from when a positioning occasion of the reference cell is to occur. In LTE embodiments, this timing offset may be specified in terms of subframes, and thereby referred to as a cell-specific subframe period in TS 36.211, a PRS periodicity in TS 36.211, or a cell-specific subframe configuration period in TS 36.133. Regardless of terminology, such a timing offset indicates an offset between the first subframe of the positioning occasion of one cell and the first subframe of a positioning occasion of the reference cell.

Of course, other cells not serving as the reference cell may alternatively serve as the basis for such relative positioning occasion timing. That is, in general, the assistance data may indicate positioning occasion timing of one cell relative to the positioning occasion timing of another cell, even if that cell is not a reference cell (e.g., a serving cell that is not the reference cell). Despite this general application, various embodiments herein may be described based on the convenient assumption that assistance data indicates the positioning occasion timing of a cell 42 relative to the positioning occasion timing of a reference cell.

Figure 6:
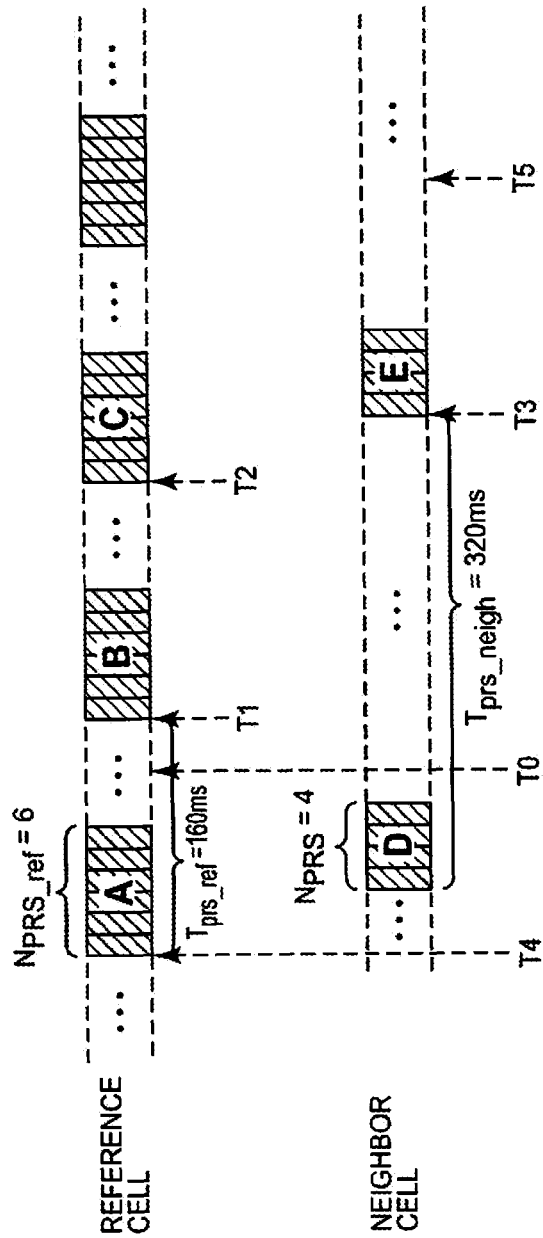
FIG. 6 illustrates positioning occasion timing of a reference cell and a neighbor cell according to one example.

While indicating positioning occasion timing relative to another cell (e.g., a reference cell) in this way proves efficient, it adds complexities in some contexts. Consider, for example, the context shown in FIG. 6, wherein positioning occasion timing is indicated relative to the reference cell and the positioning occasion periodicity of the reference cell ($T_{prs\_ref}$=160 ms) is smaller than that of a neighbor cell 42 ($T_{prs\_neigh}$=320 ms) indicated in the assistance data. If the network node 44 were to generate the assistance data at time T0, the node 44 would calculate that the timing offset between the next positioning occasion of the reference cell (occasion B, starting at time T1) and the next positioning occasion of the neighbor cell (occasion E, starting at time T3) has a value of offset=T1-T3. Yet, if the UE 36 does not receive the assistance data until after time T1, the UE 36 could reasonably interpret the received timing offset as being an offset from reference cell positioning occasion C that starts at time T2, rather than T1, because from the UE's perspective the next positioning occasion of the reference cell starts at time T2. In this case, the UE 36 would incorrectly determine that the next positioning occasion E of the neighbor cell starts at time T2+offset=T5, rather than at time T1+offset=T3.

Figure 7:
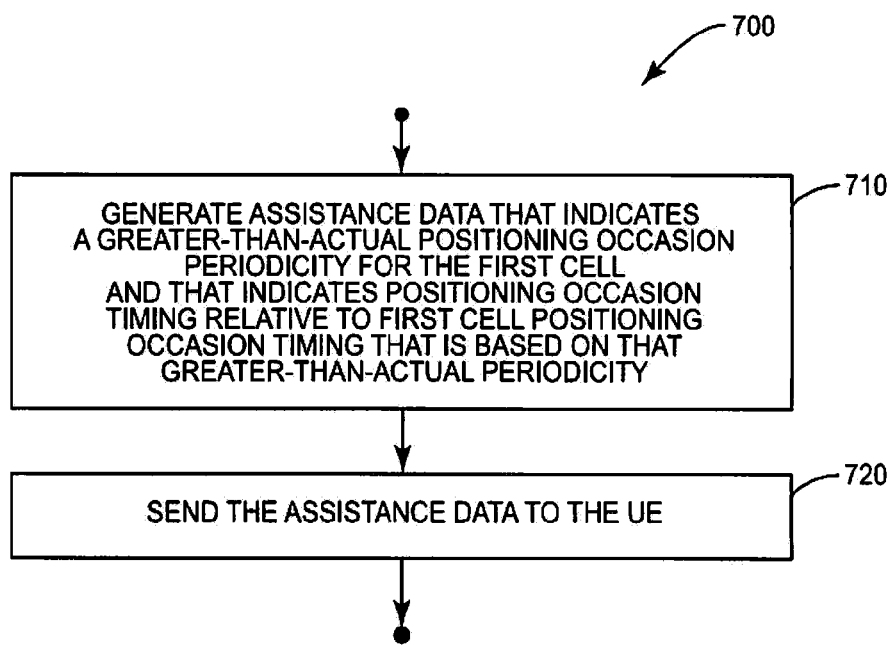
FIG. 7 is a logic flow diagram of a method implemented by a network node for assisting a user equipment to perform positioning measurements, according to one or more embodiments.

According to one or more embodiments herein, however, the network node 44 advantageously eliminates or at least mitigates this timing ambiguity by performing the processing 700 shown in FIG. 7. As shown in FIG. 7, this processing 700 includes generating assistance data that indicates a first cell (e.g., the reference cell) has a positioning occasion periodicity that is greater than the actual positioning occasion periodicity of the first cell (Block 710). The greater periodicity may be, for example, a multiple of the actual positioning occasion periodicity. Regardless, such processing generates the assistance data to indicate positioning occasion timing for at least a second cell 42 relative to positioning occasion timing for the first cell that is based on this greater periodicity. Finally, processing 700 includes sending the generated assistance data to the UE 36 to assist with the positioning measurements (Block 720).

By indicating that the first cell has a greater positioning occasion periodicity than it actually has, the node 44 of course degrades the measurement quality of the first cell since the positioning occasions of that cell will occur less frequently. The measurement quality of other cells may also be degraded since positioning measurements of those cells may also occur less frequently. Despite this, indicating that the first cell has a greater positioning occasion periodicity than it actually has advantageously reduces the number of possible first cell positioning occasions on which the positioning occasion timing in the assistance data could be based. This in turn mitigates any potential timing ambiguity seen by the UE 36. In fact, such ambiguity can be essentially eliminated if the first cell positioning occasion periodicity indicated is large enough.

In some embodiments, for example, the network node 44 generates the assistance data by determining the maximum positioning occasion periodicity amongst the actual positioning occasion periodicities of the cells to be included in the assistance data. The node 44 then generates the assistance data to indicate that the first cell has this maximum positioning occasion periodicity.

Figure 8:
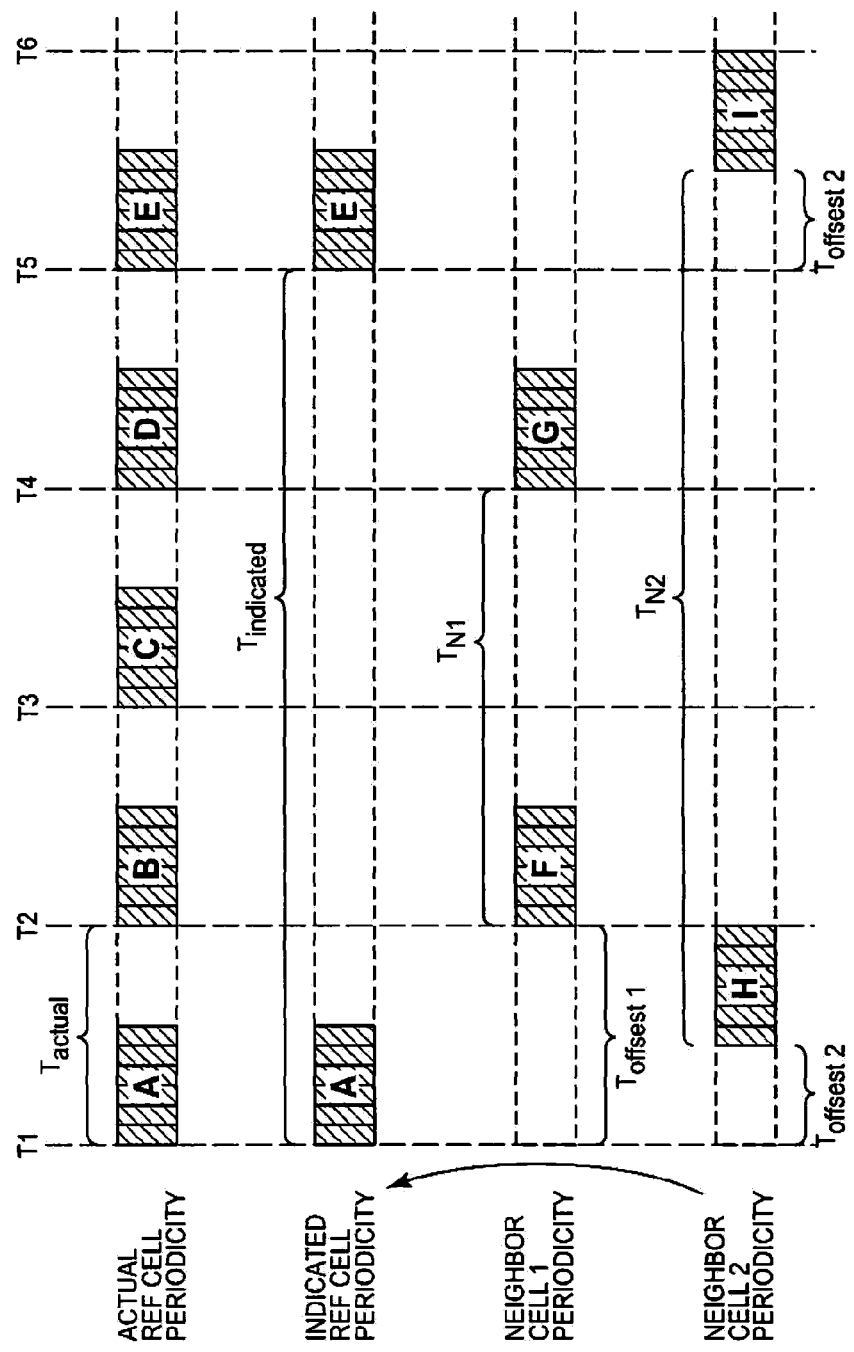
FIG. 8 is an example that illustrates a network node's generation of assistance data according to one or more embodiments.

FIG. 8 illustrates a helpful example of these embodiments where the first cell described above is the reference cell. As shown in FIG. 8, the reference cell has an actual positioning occasion periodicity $T_{actual}$ such that the reference cell's positioning occasions A-E occur at times T1-T5, and so on. Two neighbor cells (referred to simply as cells 1 and 2) to be included in the assistance data, by contrast, have positioning occasion periodicities that are greater than $T_{actual}$. The first neighbor cell (N1), for example, has a positioning occasion periodicity $T_{N1}$ that is twice as large as $T_{actual}$, such that this first cell's positioning occasions F and G occur at times T2 and T4, and so on. The second neighbor cell (N2) similarly has a positioning occasion periodicity $T_{N2}$ that is four times as large as $T_{actual}$, such that the second cell's positioning occasions H and I end at times T2 and T6, and so on.

According to embodiments herein, the network node 44 determines that the second neighbor cell (N2) has the maximum positioning occasion periodicity $T_{N2}$ amongst the actual positioning occasion periodicities of the cells 42 to be included in the assistance data. The node 44 then generates the assistance data to indicate that the reference cell has this maximum positioning occasion periodicity $T_{N2}$, even though the reference cell actually has positioning occasion periodicity $T_{actual}$. As shown in FIG. 8, therefore, the positioning occasion periodicity indicated in the assistance data ($T_{indicated}$) for the reference cell is the positioning occasion periodicity of the second neighbor cell (i.e., $T_{indicated}$=TN2), rather than the actual positioning occasion periodicity of the reference cell ($T_{actual}$).

Moreover, the node 44 generates the assistance data to indicate the positioning occasion timing for the first and second neighbor cells N1 and N2 relative to positioning occasion timing for the reference cell that is based on this greater periodicity $T_{indicated}$ instead of the actual periodicity $T_{actual}$. The node 44, for example, includes a timing offset $T_{offset1}$ in the assistance data for the first neighbor cell N1 that indicates that positioning occasions of the first neighbor cell N1 are offset from positioning occasions of the reference cell by T1-T2. Based on the indicated periodicity for the reference cell, and this timing offset $T_{offset1}$, the UE 36 determines that a positioning occasion A for the reference cell occurs at time T1, and that a positioning occasion F for the first neighbor cell N2 occurs at time T2.

Yet because the assistance data indicated that the reference cell positioning occasion periodicity is $T_{indicated}$=TN2, the UE 36 will not recognize that another positioning occasion G for the first neighbor cell N2 occurs at time T4 (in addition to not recognizing that other positioning occasions B, C, and D for the reference cell occur at times T2, T3, and T4). Instead, the UE 36 will determine that the next positioning occasion of the reference cell (after occasion A at time T1) is positioning occasion E at time T1+$T_{indicated}$=T5. The UE 36 will then determine that the next positioning occasion of the first neighbor cell N1 occurs at time T6, rather than at time T4. Note that although the node 44 similarly includes a timing $T_{offset2}$ in the assistance data for the second neighbor cell N2, the UE 36 will not skip over any positioning occasions of that cell because the cell's positioning occasions occur with the same periodicity as that indicated for the reference cell's positioning occasions.

Given the inherent tradeoff between mitigating timing ambiguities in the assistance data and degrading measurement quality, one or more embodiments herein advantageously generate the assistance data to indicate that the first cell (e.g., the reference cell) has a greater positioning occasion periodicity than it actually has only if doing so is needed to mitigate timing ambiguities. In at least one embodiment, for example, the network node 44 compares the actual positioning occasion periodicity of the first cell with the actual positioning occasion periodicity of each cell to be included in the assistance data. If the actual positioning occasion periodicity of the first cell is less than the actual positioning occasion periodicity of at least one of those cells, then the node 44 generates the assistance data to indicate that the first cell has a greater positioning occasion periodicity than it actually has. Otherwise, if the actual positioning occasion periodicity of the first cell is equal to or greater than the actual positioning occasion periodicities of each of those cells, then the node 44 generates the assistance data to indicate that the first cell has its actual positioning occasion periodicity.

Still other embodiments resort to generating the assistance data to indicate that the first cell has a greater positioning occasion periodicity than it actually has only if other approaches to mitigating timing ambiguities in the assistance data prove unattainable or otherwise unacceptable. One such approach includes the network node 44 attempting to time its transmission of assistance data to the UE 36 in a way that enables the node 44 to be certain about between which two positioning occasions of the first cell the UE 36 will receive the data. This would in turn enable the UE 36 to be certain about which positioning occasion of the first cell the network node 44 calculated a received timing offset relative to.

In more detail, the network node 44 according to this approach attempts to selectively delay transmission of assistance data to the UE 36 as needed, based on defined uncertainty in one or more timing parameters, for the network node 44 to identify with certainty between which two consecutive positioning occasions of the first cell the UE 36 will receive that assistance data. If the node 44 is able to delay assistance data transmission in this way then the node could generate the assistance data to be transmitted to indicate positioning occasion timing for at least one cell 42 relative to the latter of those two consecutive positioning occasions of the first cell.

The defined uncertainty on which the network node 44 would base this selective delay may represent, for example, uncertainty in the local time at the network node 44, uncertainty in the message processing delay at the network node 44, uncertainty in the signaling delay between the network node 44 and the UE 36, uncertainty in the frame timing of the cells 42 at issue, or any combination thereof. Regardless, the network node 44 would effectively acknowledge that this defined uncertainty compromises its ability to identify between which two positioning occasions of the first cell the UE 36 will receive the assistance data. The network node 44 would thereby take into account the defined uncertainty by refraining from transmitting the assistance data if the defined uncertainty in the timing parameters is rendering the node 44 uncertain about the identity of the first cell positioning occasions between which the UE 36 will receive the assistance data. When the defined uncertainty in the timing parameters no longer renders the node 44 uncertain in this regard, the node 44 would transmit the assistance data.

In at least some embodiments, though, the node 44 advantageously determines that the defined uncertainty in the timing parameters is so great that the node 44 will never be certain about the identity of the first cell positioning occasions between which the UE 36 will receive the assistance data. Consider an example where the network node 44 utilizes the defined uncertainty to compute different time windows during which the identification (and therefore assistance data transmission) is permissible. In this case, the node 44 may compute time windows with zero length, meaning that there is not any window of time during which the network node 44 could transmit the assistance data and confidently identify the first cell positioning occasions between which the UE 36 would receive that data. The network node 44 may therefore resort to the above described approach instead.

Note of course that at least in some embodiments the above approach is UE-specific. That is, while the network node 44 may generate assistance data for one UE 36 to indicate that the first cell has a greater positioning occasion periodicity than it actually has, the node 44 may generate assistance data for a different UE 36 to indicate that the same first cell has its actual positioning occasion periodicity. The UE-specific nature of the approach is attributable to the fact that different cells 42 may be included in the assistance data for different UEs 36, meaning that assistance data for different UEs 36 may not both have the same timing ambiguities.

Nonetheless, when generating assistance data to indicate that the first cell has a greater positioning occasion periodicity than it actually has, those skilled in the art will appreciate that the network node 44 may do so in any number of possible ways. The node 44 may for instance include an explicit indicator in the assistance data that directly indicates the positioning occasion periodicity of the first cell. In at least some embodiments, by contrast, the node 44 instead includes an explicit indicator in the assistance data that indirectly indicates the positioning occasion periodicity of the first cell. Such an explicit indicator may be, for instance, a configuration index value that is mapped to a specific periodicity. In this case, the network node 44 generates the assistance data by selecting from a set of different positioning signal configuration indices an index for the first cell that maps to a positioning occasion periodicity that is greater than the actual positioning occasion periodicity of the first cell. The node 44 then includes the selected index in the assistance data.

Those skilled in the art will also understand that the above mentioned positioning signals may be transmitted on the same or different frequencies across the cells 42. That is, the signals may be inter-frequency or intra-frequency. The above embodiments may therefore be implemented by UEs that need measurement gaps to perform positioning measurements on inter-frequency signals, as well as by UEs that do not need such gaps. Indeed, standardized operation of a UE 36 may dictate that measurement gaps be configured for such positioning measurements, even if the UE 36 is technically capable of performing the measurements without them. One such UE 36 may be, for instance, a device capable of carrier aggregation.

Those skilled in the art will further appreciate that the UE 36 described herein may be any wireless node capable of performing positioning measurements on positioning signals 46. In this regard, the UE 36 may be a mobile terminal (e.g., a smart phone, a personal digital assistant, a laptop, etc.), a sensor, a mobile relay, or even a small base station or fixed relay that is being positioned, e.g., at setup. In LTE embodiments, for instance, the UE 36 comprises any LCS target.

Moreover, the above embodiments have not been described in the context of any particular type of wireless communication system (i.e., RAT). In this regard, no particular communication interface standard is necessary for practicing the present invention. That is, the wireless communication network 30 may be any one of a number of standardized system implementations in which a UE 36 can perform positioning measurements.

Nonetheless, as one particular example, the network 30 may implement LTE or LTE-based standards. In this case, the network node 44 may comprise a positioning node that implements a positioning platform. If the platform is implemented in the user plane, the network node 44 is an SLP node, and if the platform is implemented in the control plane, the node 44 is an E-SMLC node. Moreover, signaling of the positioning result between an E-SMLC node and an LCS Client may be transferred via multiple nodes (e.g., via MME and GMLC).

Note also that LTE FDD and LTE TDD are considered as different RATs, and two LTE networks are also considered as two different LTE RATs. Further, positioning signals 46 as referred to above comprise Positioning Reference Signals (PRS) in LTE. Finally, the node 44 generates assistance data by including a prs-ConfigurationIndex element in the assistance data to indicate the positioning occasion periodicity of the first cell (e.g., the reference cell), and by including a prs-SubframeOffset element in the assistance data to indicate the timing offset for one or more other cells relative to the first cell.

Finally, the above embodiments may employ any number of positioning method types besides those examples given above. The measurements may include, for instance, Reference Signal Time Difference (RSTD) measurements for Observed Time Difference of Arrival (OTDOA) positioning. However, other types of timing measurements are just as applicable.

Figure 9:
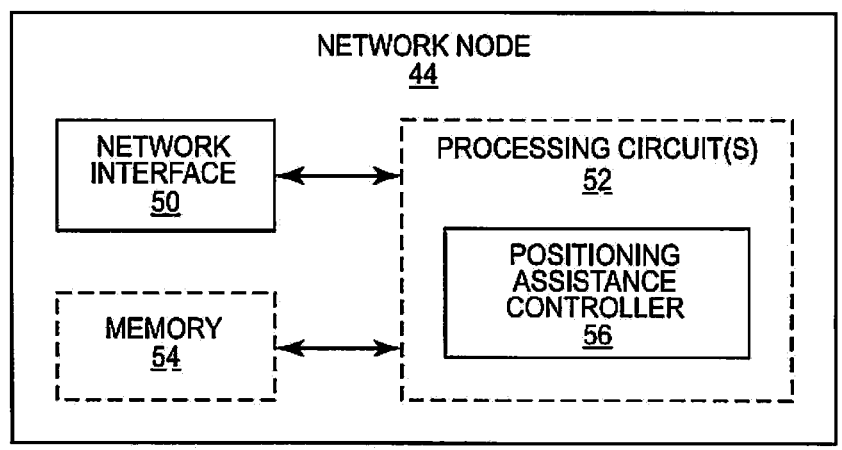
FIG. 9 is a block diagram of a network node configured according to one or more embodiments.

In view of the above described variations and modifications, those skilled in the art will appreciate that the network node 44 herein generally is configured according to the apparatus shown in FIG. 9. As shown in FIG. 9, the network node 44 includes one or more network interfaces 50, one or more processing circuits 52, and a memory 54. The one or more network interfaces 50 are configured to communicatively couple the network node 44 to the UE 36, via one or more intermediate nodes such as base stations 40. The one or more processing circuits 52 further include a positioning assistance controller 56.

The positioning assistance controller 56 is configured to generate assistance data and to send that generated assistance data to a UE 36 via the one or more network interfaces. In generating the assistance data, though, the positioning assistance controller 56 is configured to generate the assistance data to indicate that a first cell has a positioning occasion periodicity that is greater than the actual positioning occasion periodicity of the first cell. Moreover, the controller 56 is configured to generate the assistance data to indicate positioning occasion timing for at least a second cell 42 relative to positioning occasion timing for the first cell that is based on this greater periodicity.

Of course, those skilled in the art will appreciate that the various "circuits" described may refer to a combination of analog and digital circuits, and/or one or more processors configured with software stored in memory 54 and/or firmware stored in memory 54 that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method implemented by a network node in a wireless communication network for assisting a user equipment to perform positioning measurements on positioning signals periodically transmitted by one or more cells during respective positioning occasions of those cells, the method comprising:
    generating assistance data that indicates a first cell has a positioning occasion periodicity that is greater than the actual positioning occasion periodicity of the first cell, and that indicates positioning occasion timing for at least a second cell relative to positioning occasion timing for the first cell that is based on said greater periodicity; and
    sending the generated assistance data to the user equipment to assist with said positioning measurements.

2. The method of claim 1, wherein said generating comprises:
    determining a maximum positioning occasion periodicity amongst the actual positioning occasion periodicities of said cells; and
    generating the assistance data to indicate the first cell has said maximum positioning occasion periodicity.

3. The method of claim 2, wherein the first cell comprises a reference cell, wherein positioning measurements performed with respect to the reference cell serve as a reference for positioning measurements performed with respect to other cells.

4. The method of claim 1, further comprising:
    comparing the actual positioning occasion periodicity of the first cell with the actual positioning occasion periodicity of each cell;
    generating the assistance data to indicate said greater periodicity for the first cell if the actual positioning occasion periodicity of the first cell is less than the actual positioning occasion periodicity of at least one of said cells; and
    otherwise, if the actual positioning occasion periodicity of the first cell is equal to or greater than the actual positioning occasion periodicity of each cell, generating the assistance data to indicate the first cell has its actual positioning occasion periodicity.

5. The method of claim 4, wherein the first cell comprises a reference cell, wherein positioning measurements performed with respect to the reference cell serve as a reference for positioning measurements performed with respect to other cells.

6. The method of claim 1, further comprising generating assistance data for a different user equipment that indicates the same first cell has its actual positioning occasion periodicity.

7. The method of claim 6, wherein the first cell comprises a reference cell, wherein positioning measurements performed with respect to the reference cell serve as a reference for positioning measurements performed with respect to other cells.

8. The method of claim 1, wherein said generating comprises:
    selecting from a set of different positioning signal configuration indices an index for the first cell that maps to a positioning occasion periodicity that is greater than the actual positioning occasion periodicity of the first cell; and
    including the selected index in the assistance data.

9. The method of claim 1, wherein said generation of the assistance data to indicate a greater positioning occasion periodicity for the first cell is performed responsive to determining that transmission of the assistance data cannot be delayed to identify with certainty between which two consecutive positioning occasions of the first cell the user equipment will receive that assistance data.

10. The method of claim 1, wherein said positioning measurements comprise Reference Signal Time Difference (RSTD) measurements for Observed Time Difference of Arrival (OTDOA) positioning.

11. The method of claim 1, wherein the wireless communication network comprises a Long Term Evolution (LTE) network, wherein the positioning signals comprise Positioning Reference Signals (PRS), wherein the network node is an Enhanced Serving Mobile Location Center, wherein a prs-ConfigurationIndex element in the assistance data indicates the positioning occasion periodicity of the first cell, and wherein a prs-SubframeOffset element in the assistance data indicates the positioning occasion timing for said second cell.

12. The method of claim 11, wherein the positioning occasion periodicity of the first cell is derivable from the prs-Configuration Index element, in terms of subframes, as a positioning subframe configuration period.

13. The method of claim 1, wherein the first cell comprises a reference cell, wherein positioning measurements performed with respect to the reference cell serve as a reference for positioning measurements performed with respect to other cells.

14. A network node in a wireless communication network configured to assist a user equipment to perform positioning measurements on positioning signals periodically transmitted from one or more cells during respective positioning occasions of those cells, the network node comprising:
    one or more processing circuits configured to generate assistance data that indicates a first cell has a positioning occasion periodicity that is greater than the actual positioning occasion periodicity of the first cell, and that indicates positioning occasion timing for at least a second cell relative to positioning occasion timing for the first cell that is based on said greater periodicity; and
    a network interface for sending the generated assistance data to the user equipment to assist with said positioning measurements.

15. The network node of claim 14, wherein the one or more processing circuits are configured to generate said assistance data by:
    determining a maximum positioning occasion periodicity amongst the actual positioning occasion periodicities of said cells; and
    generating the assistance data to indicate the first cell has said maximum positioning occasion periodicity.

16. The network node of claim 15, wherein the first cell comprises a reference cell, wherein positioning measurements performed with respect to the reference cell serve as a reference for positioning measurements performed with respect to other cells.

17. The network node of claim 14, wherein the one or more processing circuits are configured to:
    compare the actual positioning occasion periodicity of the first cell with the actual positioning occasion periodicity of each cell;
    generate the assistance data to indicate said greater periodicity for the first cell if the actual positioning occasion periodicity of the first cell is less than the actual positioning occasion periodicity of at least one of said cells; and
    otherwise, if the actual positioning occasion periodicity of the first cell is equal to or greater than the actual positioning occasion periodicity of each cell, generate the assistance data to indicate the first cell has its actual positioning occasion periodicity.

18. The network node of claim 17, wherein the first cell comprises a reference cell, wherein positioning measurements performed with respect to the reference cell serve as a reference for positioning measurements performed with respect to other cells.

19. The network node of claim 14, wherein the one or more processing circuits are further configured to generate assistance data for a different user equipment that indicates the same first cell has its actual positioning occasion periodicity.

20. The network node of claim 19, wherein the first cell comprises a reference cell, wherein positioning measurements performed with respect to the reference cell serve as a reference for positioning measurements performed with respect to other cells.

21. The network node of claim 14, wherein the one or more processing circuits are configured to generate said assistance data by:
    selecting from a set of different positioning signal configuration indices an index for the first cell that maps to a positioning occasion periodicity that is greater than the actual positioning occasion periodicity of the first cell; and
    including the selected index in the assistance data.

22. The network node of claim 14, wherein the one or more processing circuits are configured to generate the assistance data to indicate a greater positioning occasion periodicity for the first cell responsive to determining that transmission of the assistance data cannot be delayed to identify with certainty between which two consecutive positioning occasions of the first cell the user equipment will receive that assistance data.

23. The network node of claim 14, wherein said positioning measurements comprise Reference Signal Time Difference (RSTD) measurements for Observed Time Difference of Arrival (OTDOA) positioning.

24. The network node of claim 14, wherein the wireless communication network comprises a Long Term Evolution (LTE) network, wherein the positioning signals comprise Positioning Reference Signals (PRS), wherein the network node is an Enhanced Serving Mobile Location Center, wherein a prs-ConfigurationIndex element in the assistance data indicates the positioning occasion periodicity of the first cell, and wherein a prs-SubframeOffset element in the assistance data indicates the positioning occasion timing for said second cell.

25. The network node of claim 24, wherein the positioning occasion periodicity of the first cell is derivable from the prs-ConfigurationIndex element, in terms of subframes, as a positioning subframe configuration period.

26. The network node of claim 14, wherein the first cell comprises a reference cell, wherein positioning measurements performed with respect to the reference cell serve as a reference for positioning measurements performed with respect to other cells.

* * * * *

UNITED STATES PATENT AND TRADEMARK OFFICE
CERTIFICATE OF CORRECTION

PATENT NO.        : 8,781,506 B2
APPLICATION NO.   : 13/390551
DATED             : July 15, 2014
INVENTOR(S)       : Siomina et al.

Page 1 of 1

It is certified that error appears in the above-identified patent and that said Letters Patent is hereby corrected as shown below:

In the Specification

In Column 2, Line 26, delete "Mobiel" and insert -- Mobile --, therefor.

In Column 10, Line 23, delete "=TN2)," and insert -- =$T_{N2}$), --, therefor.

In Column 10, Line 41, delete "=TN2," and insert -- =$T_{N2}$, --, therefor.

Signed and Sealed this
Nineteenth Day of May, 2015

Michelle K. Lee
*Director of the United States Patent and Trademark Office*